(12) United States Patent
Yu (10) Patent No.: US 11,639,112 B2
(45) Date of Patent: May 2, 2023

(54) FUSION OF DATA OF MULTIPLE SENSORS FOR OBJECT IDENTIFICATION

(71) Applicant: Robert Bosch GmbH, Stuttgart (DE)

(72) Inventor: Zerong Yu, Kanagawa (JP)

(73) Assignee: ROBERT BOSCH GMBH, Stuttgart (DE)

( * ) Notice: Subject to any disclaimer, the term of this patent is extended or adjusted under 35 U.S.C. 154(b) by 391 days.

(21) Appl. No.: 16/603,475

(22) PCT Filed: Mar. 14, 2018

(86) PCT No.: PCT/EP2018/056358
§ 371 (c)(1),
(2) Date: Oct. 7, 2019

(87) PCT Pub. No.: WO2018/188877
PCT Pub. Date: Oct. 18, 2018

(65) Prior Publication Data
US 2021/0133486 A1 May 6, 2021

(30) Foreign Application Priority Data
Apr. 10, 2017 (DE) .......................... 102017206123.5

(51) Int. Cl.
*B60L 3/00* (2019.01)
*B60W 50/023* (2012.01)
(Continued)

(52) U.S. Cl.
CPC ......... *B60L 3/0092* (2013.01); *B60W 50/023* (2013.01); *G05B 19/042* (2013.01);
(Continued)

(58) Field of Classification Search
CPC ...... G06K 9/629; G06K 9/00791; G06K 9/46; G06K 9/6289; B60W 50/023;
(Continued)

(56) References Cited

U.S. PATENT DOCUMENTS 8,108,097 B2 * 1/2012 Mattes .................... B60T 8/172
701/36
2009/0135065 A1 5/2009 Tsuchida et al.
(Continued)

FOREIGN PATENT DOCUMENTS

DE  102007018470 A1  10/2008
JP  2008046927 A     2/2008

OTHER PUBLICATIONS

International Search Report for PCT/EP2018/056358, dated Jun. 19, 2018.

*Primary Examiner* — Ig T An
(74) *Attorney, Agent, or Firm* — Norton Rose Fulbright US LLP; Gerard Messina (57) ABSTRACT

A method for fusing various sensor data of a vehicle within the scope of an object identification (OI). At least one identification feature (IF) detected by a first sensor (FS) and at least one IF detected by a second sensor (SS) for identifying at least one object in the vehicle's surroundings are received. In the task, at least one IF detected by the SS for inspecting the OI is received, the IF detected by the FS and the IF detected by the SS each representing a first measured variable (MV) and the IF detected by the SS representing a second MV independent of the first MV. In a further task, the IF detected by the FS is linked to the IF detected by the SS to generate a feature linkage. In a third task, the plausibility of the feature linkage is checked using the IF detected by the SS.

12 Claims, 4 Drawing Sheets

(51) Int. Cl.
*G05B 19/042* (2006.01)
*G06V 20/56* (2022.01)
*G06F 18/25* (2023.01)
*G06V 20/58* (2022.01)
*B60W 50/02* (2012.01)

(52) U.S. Cl.
CPC .......... *G06F 18/251* (2023.01); *G06F 18/253* (2023.01); *G06V 20/56* (2022.01); *G06V 20/58* (2022.01); *B60W 2050/0215* (2013.01); *G05B 2219/25257* (2013.01); *G05B 2219/2637* (2013.01)

(58) Field of Classification Search
CPC ......... B60W 2050/0215; G05B 19/042; G05B 2219/25257; G05B 2219/2637
See application file for complete search history.

(56) References Cited

U.S. PATENT DOCUMENTS

| | | | |
|---|---|---|---|
| 2010/0085238 A1* | 4/2010 | Muller-Frahm | G01S 13/867 342/70 |
| 2015/0274161 A1 | 10/2015 | Stierlin | |
| 2016/0040994 A1* | 2/2016 | Bartels | G01S 19/42 701/468 |
| 2017/0287233 A1* | 10/2017 | Nix | G08G 1/166 |
| 2018/0257684 A1* | 9/2018 | Fischer | B61L 23/041 |
| 2019/0049958 A1* | 2/2019 | Liu | G01S 7/497 |

* cited by examiner

FUSION OF DATA OF MULTIPLE SENSORS FOR OBJECT IDENTIFICATION

FIELD OF THE INVENTION

The present invention is directed to a device or a method. The subject matter of the present invention is also a computer program.

BACKGROUND INFORMATION

Modern vehicles may be equipped with driver assistance systems. In this case, objects in the vehicle surroundings may be detected and identified with the aid of a suitable surroundings sensor system. The components of the surroundings sensor system and the object identification may correspond to different ASIL safety criteria depending on the requirement.

The requirements of many new applications in the automotive field may only be fulfilled with difficulty by a single sensor system. This relates, for example, to driver assistance systems and systems for automated driving. In particular, the fusion of sensor data plays an important role for the sensor-assisted identification and tracking of objects.

SUMMARY OF THE INVENTION

Against this background, the approach presented here provides a method for the fusion of data of various sensors of a vehicle within the scope of an object identification, furthermore a device which uses this method, and finally a corresponding computer program according to the main descriptions herein. Advantageous refinements of and improvements on the device specified herein are possible by way of the measures set forth in the further descriptions herein.

A method for the fusion of data of various sensors of a vehicle within the scope of an object identification is provided, the method including the following steps:

receiving at least one identification feature detected by a first sensor and at least one identification feature detected by a second sensor for identifying at least one object in the surroundings of the vehicle;

receiving at least one inspection feature detected by the second sensor for inspecting the object identification, the identification feature detected by the first sensor and the inspection feature detected by the second sensor each representing a first measured variable and the identification feature detected by the second sensor representing a second measured variable independent of the first measured variable;

linking the identification feature detected by the first sensor to the identification feature detected by the second sensor to generate a feature linkage; and checking the plausibility of the feature linkage using the inspection feature detected by the second sensor.

A sensor may be understood, for example, as a surroundings sensor for detecting the surroundings of the vehicle, for example, in the form of a radar or LIDAR sensor or a camera, or an acceleration sensor or another suitable sensor for detecting safety-relevant parameters. The first sensor and the second sensor may be separate sensor subsystems, which are independent of one another, for object identification. An identification feature may be understood as a feature based on a physical measured variable for identifying objects. For example, the identification feature may be a feature of the object detected on the basis of a velocity, acceleration, movement direction, shape, color, or size. An inspection feature may also be understood as a feature for identifying objects based on a physical measured variable. In contrast to the identification feature, the inspection feature may be, for example, a feature of the object detected at a lesser accuracy than the identification feature. Two measured variables independent of one another may be understood as measured variables which are not related or are only related to one another to a very limited extent from a physical or mathematical aspect. Thus, for example, the first measured variable may be a velocity and the second measured variable may be a shape of the object.

The approach presented here is based on the finding that a data fusion may be carried out at a lower level, i.e., at a signal or feature level, within the scope of an object identification in a vehicle in such a way that the object identification is carried out on the basis of an ASIL decomposition. For example, various sensor paths may be linked to one another and checked for plausibility according to ASIL B in such a way that a piece of identification information may be generated according to ASIL D. For this purpose, in addition to the function features detected by the sensors, specific inspection features, which are also detected by the sensors, possibly with lesser accuracy, may be used as a redundancy to check the plausibility of a data fusion carried out on the basis of the function features. Both the performance and the reliability of the system function may thus be ensured even with comparatively low system costs.

A sensor data fusion may be carried out on various levels, which each have their advantages and disadvantages. To carry out a data fusion on a lower level, it is necessary to provide and configuration a suitable safety concept. The independence of the components may only be achieved with difficulty if the data are already fused and brought together on the signal and feature level. In this case, a decomposition of ASIL classifications and requirements normally may no longer be carried out. This means that the resulting ASIL classification for each individual system may be higher. This problem may be solved with the aid of the approach presented here.

According to one specific embodiment, in the step of receiving, at least one inspection feature detected by the first sensor may be received for inspecting the object identification. The inspection feature detected by the first sensor may represent the second measured variable. In the step of linking, the inspection feature detected by the first sensor may be linked to the inspection feature detected by the second sensor to produce a redundant feature linkage. In the step of inspecting for plausibility, the feature linkage may be checked for plausibility using the redundant feature linkage. The reliability of the object identification may thus be significantly enhanced with comparatively low costs.

In a step of identifying, the object may be identified using a result of the plausibility check. An identification of the object on the basis of pieces of information already checked for plausibility is thus enabled, whereby the robustness of the object identification may be increased.

According to another specific embodiment, in a step of identifying, the object may be identified using the feature linkage. At least one test object may be identified using the redundant feature linkage. Accordingly, in the step of inspecting for plausibility, the feature linkage may be checked for plausibility by comparing the object to the test object. Particularly reliable and robust identification of the object may also be ensured by this specific embodiment.

It is advantageous if, in the step of receiving, at least one identification feature detected by a third sensor for identifying the object and at least one further inspection feature detected by the first sensor or, additionally or alternatively, by the second sensor, for inspecting the object identification are received. The identification feature detected by the third sensor and the further inspection feature may each represent the same measured variable. Accordingly, in the step of linking, the feature linkage may be generated using the identification feature detected by the third sensor. In the step of inspecting for plausibility, the feature linkage may be checked for plausibility using the further inspection feature. The object identification may thus be carried out efficiently even if more than two sensors independent of one another are used.

In particular, for example, the identification feature detected by the third sensor may represent a measured variable independent of the first measured variable or also of the second measured variable. The method may thus also meet high ASIL safety requirements.

According to another specific embodiment, in the step of receiving, at least one further identification feature detected by the first sensor or, additionally or alternatively, by the second sensor for identifying the object and at least one inspection feature detected by the third sensor for inspecting the object identification may be received. The further identification feature and the inspection feature detected by the third sensor may each represent the same measured variable. In the step of linking, the feature linkage may be generated using the further identification feature. In the step of checking for plausibility, the feature linkage may be checked for plausibility using the inspection feature detected by the third sensor. A plurality of different features detected by different sensors may thus be used for the object identification, whereby the reliability of the method may be further enhanced.

This method may be implemented, for example, in software or hardware or in a mixed form of software and hardware, for example, in a control unit.

The approach presented here furthermore provides a device which is configured to carry out, control, and/or implement the steps of a variant of a method provided here in corresponding units. The object on which the present invention is based may also be achieved rapidly and efficiently by this embodiment variant of the present invention in the form of a device.

For this purpose, the device may include at least one processing unit for processing signals or data, at least one storage unit for storing signals or data, at least one interface to a sensor or an actuator for reading-in sensor signals from the sensor or for outputting data or control signals to the actuator, and/or at least one communication interface for reading-in or outputting data, which are embedded in a communication protocol. The processing unit may be, for example, a signal processor, a microcontroller, or the like, the storage unit being able to be a flash memory, an EPROM, or a magnetic storage unit. The communication interface may be configured to read-in or output data in a wireless and/or wired manner, a communication interface which may read-in or output data in a wired manner may read-in these data, for example, electrically or optically from a corresponding data transmission line or may output these data to a corresponding data transmission line.

A device may be understood in the present case as an electrical apparatus which processes sensor signals and outputs control and/or data signals as a function thereof. The device may include an interface, which may be configured as hardware and/or software. In a hardware configuration, the interfaces may be, for example, part of a so-called system ASIC, which includes greatly varying functions of the device. However, it is also possible that the interfaces are separate, integrated circuits or are made at least partially of discrete components. In a software configuration, the interfaces may be software modules, which may be provided on a microcontroller in addition to other software modules, for example.

In one advantageous configuration, a control of the vehicle is carried out by the device. For this purpose, the device may make use of, for example, sensor signals such as acceleration, pressure, steering angle, or surroundings sensor signals. The control is carried out via actuators such as braking or steering actuators or an engine control unit of the vehicle.

A computer program product or computer program having program code which may be stored on a machine-readable carrier or storage medium such as a semiconductor memory, a hard drive memory, or an optical memory and is used for carrying out, implementing, and/or controlling the steps of the method according to one of the above-described specific embodiments is also advantageous, in particular if the program product or program is executed on a computer or a device.

Exemplary embodiments of the present invention are illustrated in the drawings and explained in greater detail in the following description.

In the following description of advantageous exemplary embodiments of the present invention, identical or similar reference numerals are used for the elements shown in the various figures which act similarly, a repeated description of these elements being omitted.

DETAILED DESCRIPTION

DETAILED DESCRIPTION

Figure 1:
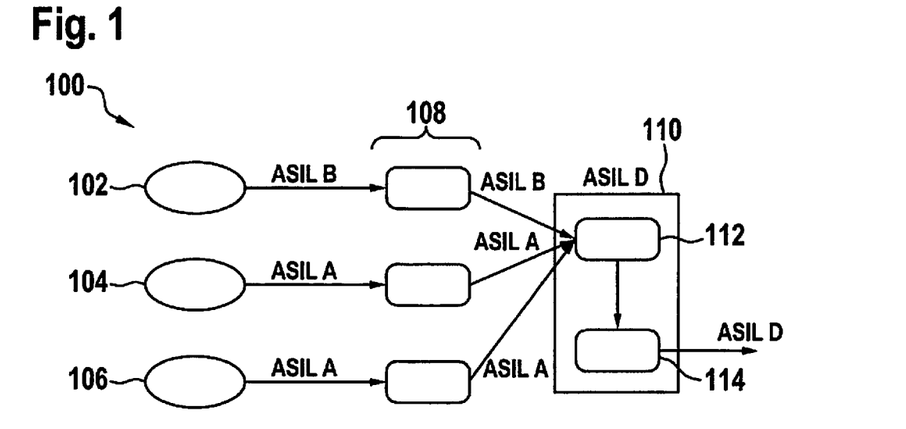
FIG. 1 shows a schematic illustration of a safety concept on a middle level having corresponding ASIL decomposition.

FIG. 1 shows a schematic illustration of a safety concept on a middle level having corresponding ASIL decomposition. A system 100 is shown made of three vehicle sensors 102, 104, 106, each for identifying an object 108. A control unit 110 is configured to carry out an object fusion using objects 108 detected by the three sensors in a first unit 112 and to carry out a situation analysis based thereon in a second unit 114. For example, first vehicle sensor 102 supplies signals according to ASIL B, while the two vehicle sensors 104, 106 supply signals according to ASIL A. The object identification carried out with the aid of control unit 110 corresponds to ASIL D.

Figure 2:
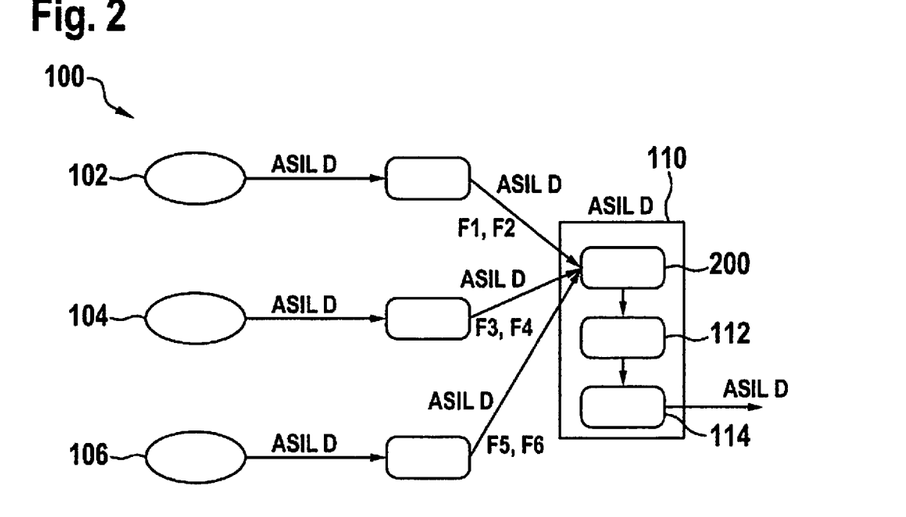
FIG. 2 shows a schematic illustration of a safety concept according to ASIL D.

FIG. 2 shows a schematic illustration of a safety concept according to ASIL D. System 100 from FIG. 1 is shown, with the difference that control unit 110, using the signals provided by the three vehicle sensors 102, 104, 106, initially carries out a feature fusion in a further unit 200 and, building thereon, carries out the object identification and the situation analysis. The individual sensor paths and the signal processing inside control unit 110 each correspond to ASIL D.

Figure 3:
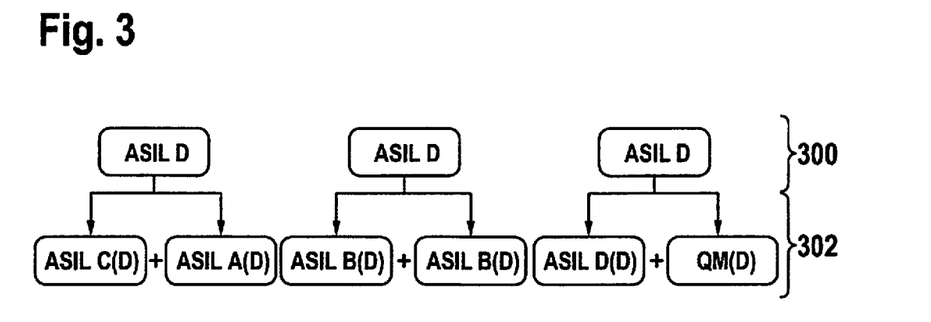
FIG. 3 shows a schematic illustration of possible ASIL decompositions.

FIG. 3 shows a schematic illustration of possible ASIL decompositions. A status before the decomposition is identified by reference numeral 300. A status after the decomposition is identified by reference numeral 302. Various decomposition options are listed hereafter:

ASIL D to ASIL C (D) and ASIL A (D);
alternatively: ASIL D to ASIL B(D) and ASIL B(D);
alternatively: ASIL D to ASIL D (D) and QM (D).

Figure 4:
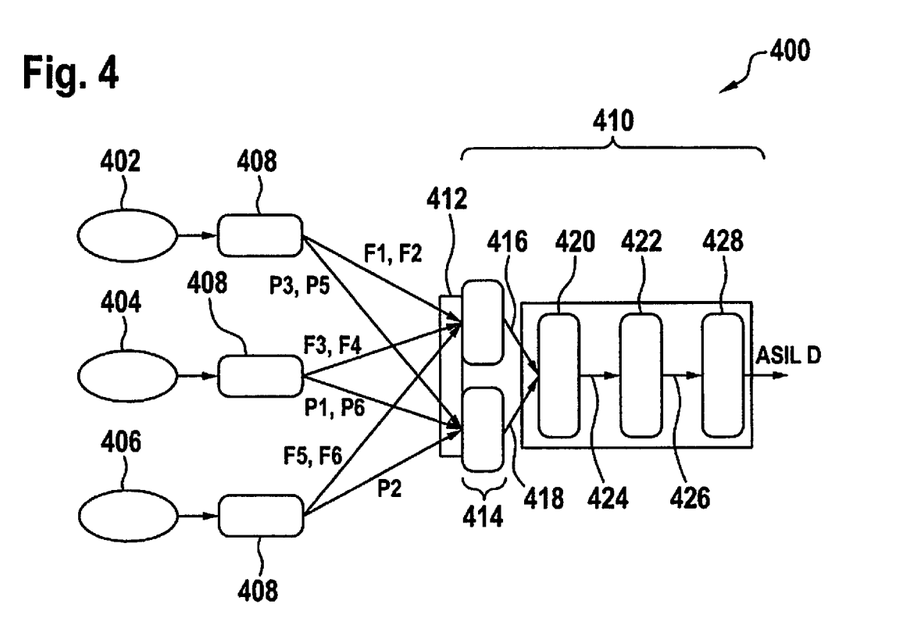
FIG. 4 shows a schematic illustration of a system for the fusion of data of various sensors of a vehicle within the scope of an object identification according to one exemplary embodiment.

FIG. 4 shows a schematic illustration of a system 400 for the fusion of data of various sensors 402, 404, 406 of a vehicle within the scope of an object identification according to one exemplary embodiment. According to this exemplary embodiment, system 400 includes a first sensor 402 for detecting identification features F1, F2, a second sensor 404 for detecting identification features F3, F4, and a third sensor 406 for detecting identification features F5, F6. Identification features F1 through F6, also called function features, are used for identifying at least one object in the surroundings of the vehicle. The identification features are in particular features which may be detected by the particular sensors with particularly great accuracy. Sensors 402, 404, 406 are each connected to a corresponding processing unit 408 for the extraction of the particular identification features.

According to this exemplary embodiment, first sensor 402 is configured to detect and provide two inspection features P3, P5 in addition to the two identification features F1, F2. Similarly thereto, second sensor 404 is configured to acquire and provide to inspection features P1, P6 in addition to the two identification features F3, F4. Third sensor 406 is configured to acquire and provide an inspection feature P2 in addition to the two identification features F5, F6. The inspection features are, for example, features which are detected by the particular sensors at a lower degree of accuracy in comparison to the particular identification features, which is sufficient for a usage within the scope of a plausibility check of the object identification, however.

For example, according to FIG. 4, identification feature F1 and inspection feature P1 represent a first measured variable for detecting the object, identification feature F3 and inspection feature P3 represent a second measured variable for detecting the object, and identification feature F5 and inspection feature P5 represent a third measured variable for detecting the object. In particular, all three measured variables are measured variables independent of one another, so that an additional redundant feature fusion on the basis of subsystems independent of one another is enabled by the inspection features.

Similarly thereto, for example, identification feature F2 and inspection feature P2 also each represent the same measured variable, and also identification feature F6 and inspection feature P6 may each represent the same measured variable.

Depending on the exemplary embodiment, either all identification features each represent a different measured variable or the identification features each only differ from sensor to sensor with respect to the measured variable on which they are based. It is important that the identification features and the inspection features associated with them each represent the same measured variable, the particular sensors for detecting the inspection features being independent of the particular sensors for detecting the identification features.

System 400 includes a device 410 having a receiver unit 412 for receiving the identification and inspection features from the three sensors 402, 404, 406, and a linking unit 414. According to the exemplary embodiment shown in FIG. 4, linking unit 414 is configured to link the identification features to one another in a corresponding feature fusion to form a feature linkage 416, on the one hand, and to link the inspection features to one another in a corresponding check fusion to form a redundant feature linkage 418, on the other hand. Linking unit 414 relays feature linkages 416, 418 to a plausibility check unit 420 for carrying out a plausibility check of feature linkage 416 on the basis of redundant feature linkage 418. An identification unit 422 is configured to unambiguously identify one object or multiple objects in the surroundings of the vehicle using a plausibility check result 424 provided by a plausibility check unit 420 and, for example, to relay a corresponding piece of object information 426 to an analysis unit 428 to carry out a situation analysis with respect to a present situation of the vehicle. The situation analysis enables, for example, the tracking of identified objects in accordance with ASIL D.

According to FIG. 4, the object identification only takes place after carrying out the plausibility check. Alternatively, the plausibility check takes place following the object identification, as is apparent from FIG. 5.

Figure 5:
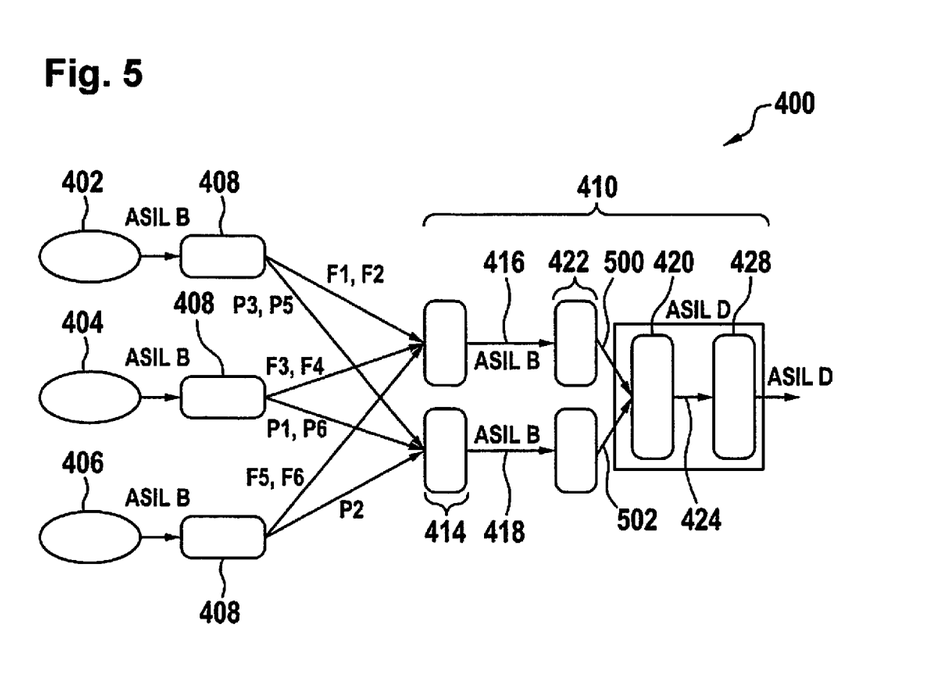
FIG. 5 shows a schematic illustration of a system for the fusion of data of various sensors of a vehicle within the scope of an object identification according to one exemplary embodiment.

FIG. 5 shows a schematic illustration of a system 400 for the fusion of data of various sensors 402, 404, 406 of a vehicle within the scope of an object identification according to one exemplary embodiment. System 400 essentially corresponds to the system described above on the basis of FIG. 4, with the difference that plausibility check unit 420 is connected upstream from identification unit 422 according to this exemplary embodiment. Identification unit 422 is configured to receive the two feature linkages 416, 418 from linking unit 414.

Feature linkage 416 is used by identification unit 422 to identify the object and to transmit an identification result 500 representing the identified object to plausibility check unit 420. In a similar way, identification unit 422 uses redundant feature linkage 418 to identify a test object and to transmit a redundant identification result 502 representing the test object to plausibility check unit 420. This unit uses the two identification results 500, 502, for example, to check the identified object for plausibility on the basis of the test object, for example, on the basis of a feature deviation between the identified object and the test object. Plausibility check result 424 is transmitted directly to analysis unit 428. Analysis unit 428 is configured, for example, to analyze the situation of the vehicle on the basis of the identified object or the identified objects if the feature deviation between the identified object and the test object is less than a predetermined deviation threshold value.

Figure 6:
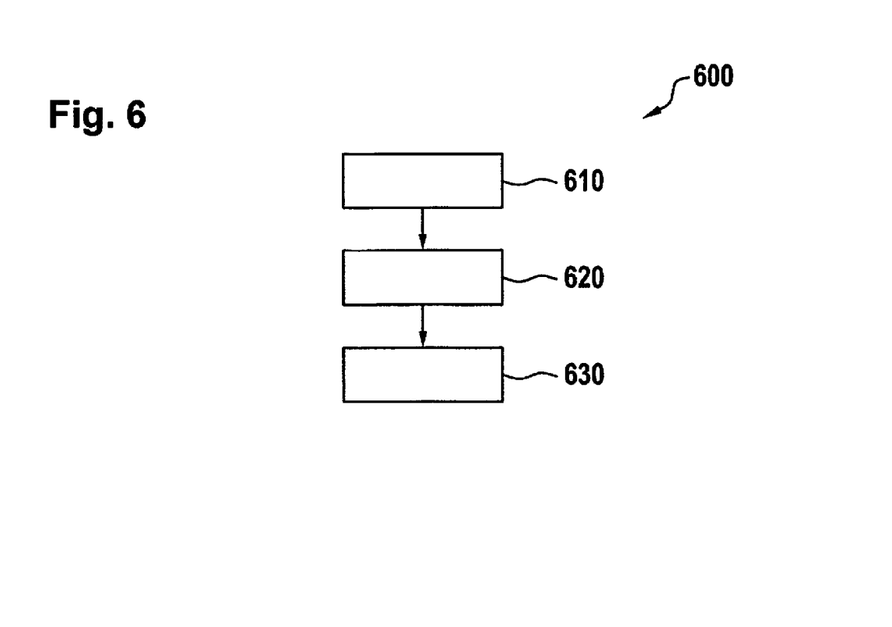
FIG. 6 shows a flow chart of a method according to one exemplary embodiment.

FIG. 6 shows a flow chart of a method 600 according to one exemplary embodiment. Method 600 for the fusion of data of various sensors of a vehicle within the scope of an object identification may be carried out, for example, by a device as described above on the basis of FIGS. 4 and 5. In a step 610, the identification features and the inspection features are received via a suitable interface to the sensors of the vehicle. In a step 620, the identification features are linked to one another to generate the feature linkage. Finally, in a step 630, the plausibility check of the feature linkage takes place using at least one of the inspection features.

Figure 7:
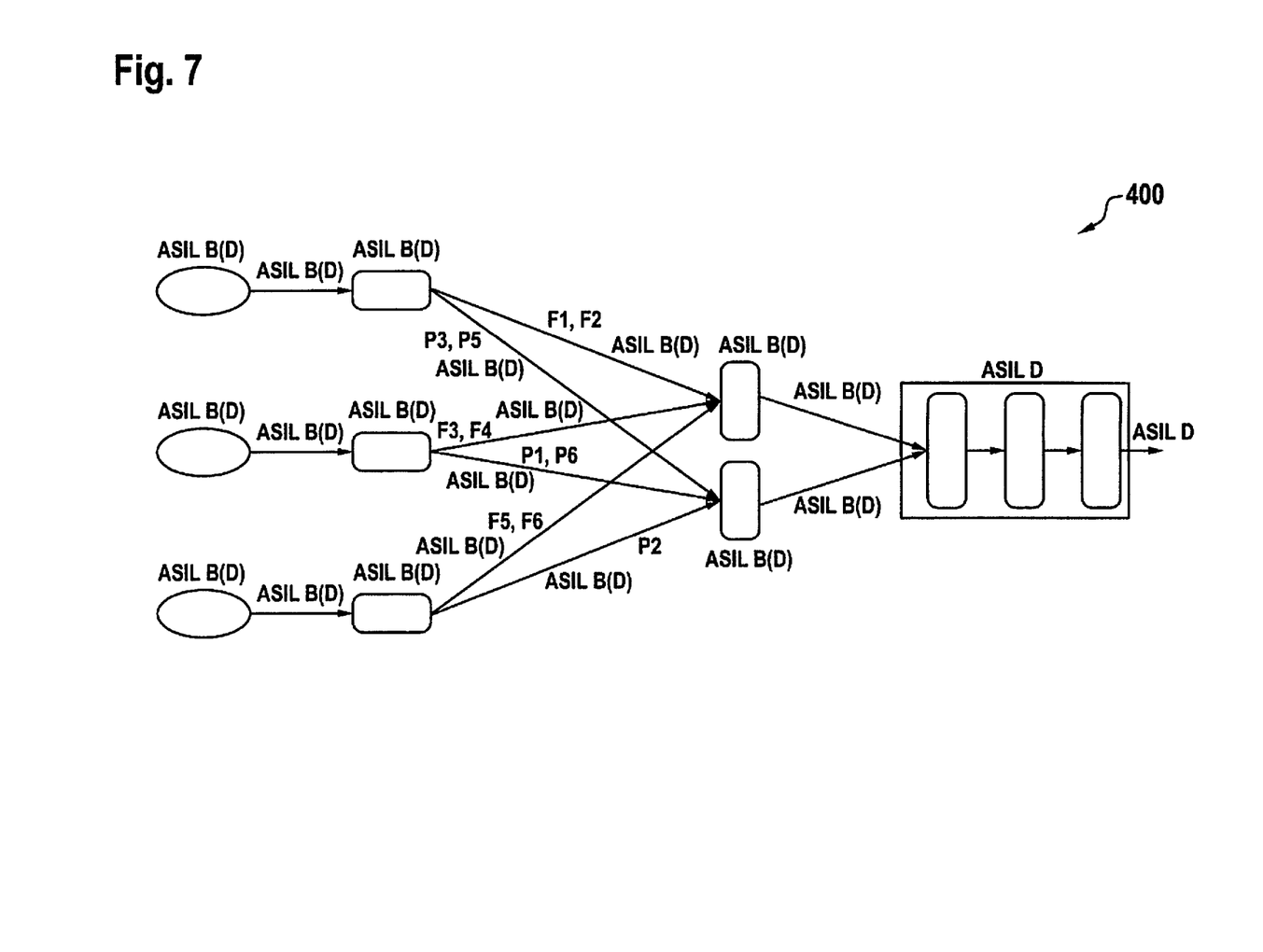
FIG. 7 shows a schematic illustration of an ASIL decomposition in a system from FIG. 4.

FIG. 7 shows a schematic illustration of an ASIL decomposition in a system 400 from FIG. 4. The feature fusions correspond to ASIL B. The highest classification of each input signal corresponds to ASIL B. The highest safety requirement of each feature corresponds to ASIL B. The sensor signals correspond to ASIL B. The sensor safety requirement corresponds to ASIL B.

Various exemplary embodiments of the approach presented here are summarized once again hereafter in other words.

In the fusion of sensor data within the scope of an object identification, a rough differentiation may be made between a low level, a middle level, and a high level. The low level corresponds to an early fusion of signals and features or their states. The data represent patterns or sampling values. On the middle level, the fusion takes place at the object level with an entity. The objects are identified independently of one another by each individual sensor system. The high level represents a fusion for the object tracking with complete situation assessment. Each sensor additionally determines the mutual relationship and movement of the object before the fusion. The lower the fusion level is, the more difficult it is to ensure the independence required for an ASIL decomposition.

For example, the system configuration shown in FIG. 1 is to meet the safety requirements according to ASIL D in its entirety. According to this configuration, the ASIL classification for an individual sensor system is ASIL A or ASIL B.

To improve the system performance and draw the greatest possible utilization from the particular strength of the individual sensor systems, a fusion at a lower level is selected according to the approach presented here.

If the best features of each system are actually selected and fused to determine the objects, however, actual redundancy would not be present in the system, so that all sensor paths would have to be developed in accordance with the highest classification ASIL D. However, the sensors are often capable of also detecting other features. For example, the distance of an object may be determined both via video and via radar, radar having a significantly greater accuracy. The problems or inadequacies mentioned in the ASIL allocation may be avoided by the approach presented here. The approach presented here advantageously enables a real redundancy during the data fusion. High system development costs may be avoided, for example, as a result of a high ASIL classification for all hardware and software components.

An ASIL classification and allocation includes the following steps, for example. A hazard and risk analysis is initially carried out, i.e., a safety risk analysis on the basis of the effects of the system on the vehicle, because system interventions generally have an effect on the safety of the vehicle. Furthermore, a safety goal is defined using ASIL classification. A safety risk evaluation is carried out with the specification of safety requirements for the system development, for example, in this case the highest classification and requirement according to ASIL D. Subsequently, a corresponding safety concept is developed using ASIL allocation to achieve the safety goal. The ASIL allocation is to be carried out for every system component. For example, if every system component has to meet the requirements according to ASIL D, high costs and a high level of effort would result to ensure a reliable and robust system.

In contrast, the ASIL decomposition represents a possible path to enhance the system robustness and reduce the safety requirements for every component, in particular for hardware components such as sensors or control units. FIG. 3 shows a decomposition concept according to ISO 26262-9: 2011(E). However, the decomposition may only be used if two subsystems are independent of one another.

The approach presented here enables redundancy to be provided in an already existing fusion concept and a corresponding decomposition to be applied therein. The ASIL allocation is carried out in such a way that a lower ASIL is associated with each subsystem than the overall system, whereby the safety risk, the safety requirements, and the costs may be reduced.

A redundant data fusion is carried out, for example, using inspection features P3 and P5, these not having been used in the original feature fusion of identification features F1 and F2. The original fusion includes, for example, a distance, which was only ascertained with the aid of a radar signal because of the greater accuracy. According to one exemplary embodiment, for example, in addition a distance signal provided via video is used to provide the redundancy. Although these are not the most suitable features or strengths of the particular sensor systems, these features are generally sufficient for the use for a check fusion. The independence between function features and inspection features is to be ensured. There is a strong correlation between velocity and acceleration, for example, so that these two features are not to be treated as independent features. In contrast, for example, velocity and shape may certainly be treated as independent features.

The original fusion is still used as before as a functional fusion to generate objects. The functional fusion is monitored with the aid of the second, redundant check fusion using a predetermined tolerance, however. This means that the functional fusion is confirmed and authorized if the deviation between functional fusion and check fusion is small enough.

Since the two fusions are independent of one another, a decomposition is now possible. One possible decomposition of ASIL D to ASIL B(D)+ASIL B(D) is shown in FIG. 4. The fusions for generating feature linkage 416 and redundant feature linkage 418 each correspond to ASIL B(D). Other combinations are also possible, for example, ASIL A(D)+ASIL C(D) or QM(D)+ASIL D(D).

Depending on the configuration, the plausibility check or the comparison of the two paths may also be carried out at a later point in time, for example, after the identification of objects or entities or after the identification of situations or movement sequences. FIG. 5 shows a possible system configuration, in which the plausibility check is carried out after the object identification.

If an exemplary embodiment includes an "and/or" linkage between a first feature and a second feature, this is to be read to mean that the exemplary embodiment includes both the first feature and the second feature according to one specific embodiment and includes either only the first feature or only the second feature according to another specific embodiment.

What is claimed is:

1. A method for fusing data of various sensors of a vehicle within the scope of an object identification, the method comprising:

receiving, via a receiver unit, at least one identification feature detected by a first sensor and at least one identification feature detected by a second sensor for identifying at least one object in the surroundings of the vehicle;

receiving, via the receiver unit, at least one inspection feature detected by the second sensor for inspecting the object identification, the identification feature detected by the first sensor and the inspection feature detected by the second sensor each representing a first measured variable and the identification feature detected by the second sensor representing a second measured variable independent of the first measured variable;

linking, via a linking unit, the identification feature detected by the first sensor to the identification feature detected by the second sensor in a corresponding feature fusion to form a feature linkage, wherein the linking unit is configured to link the inspection features to one another in a corresponding check fusion to form a redundant feature linkage;

checking, via a plausibility unit, the plausibility of the feature linkage using the inspection feature detected by the second sensor; and identifying, via an identification unit, one object or multiple objects in surroundings of the vehicle using a plausibility check result from the plausibility check unit, and relaying a corresponding piece of object information to an analysis unit to carry out a situation analysis with respect to a present situation of the vehicle, wherein the situation analysis enables tracking of the identified objects;

wherein the identifying of the one object or multiple objects is carried out based on an automotive safety integrity level (ASIL) decomposition, and the identified objects are used in a driver assistance system of the vehicle, wherein a functional fusion is used to generate the objects, wherein the functional fusion is monitored with a redundant check fusion using a predetermined tolerance, so that the functional fusion is confirmed and authorized if the deviation between functional fusion and check fusion is not more than the predetermined tolerance, and wherein in the receiving, at least one identification feature detected by a third sensor for identifying the object and at least one further inspection feature detected by the first sensor and/or the second sensor for inspecting the object identification are received, the identification feature detected by the third sensor and the further inspection feature each representing the same measured variable, in the linking, the feature linkage being generated using the identification feature detected by the third sensor, in the checking of the plausibility, the feature linkage being checked for plausibility using the further inspection feature.

2. The method of claim 1, wherein in the receiving, at least one inspection feature detected by the first sensor for inspecting the object identification is received, the inspection feature detected by the first sensor representing the second measured variable, in the linking, the inspection feature detected by the first sensor being linked to the inspection feature detected by the second sensor, to generate the redundant feature linkage in the checking of the plausibility, the feature linkage being checked for plausibility using the redundant feature linkage.

3. The method of claim 2, wherein the object is identified using the feature linkage, at least one test object being identified using the redundant feature linkage, in the checking of the plausibility, the feature linkage being checked for plausibility by comparing the object to the test object.

4. The method of claim 1, wherein the identification feature detected by the third sensor represents a measured variable independent of the first measured variable and/or the second measured variable.

5. The method of claim 1, wherein in the receiving, at least one further identification feature detected by the first sensor and/or the second sensor for identifying the object and at least one inspection feature detected by the third sensor for inspecting the object recognition are received, the further identification feature and the inspection feature detected by the third sensor representing the same measured variable, in the linking, the feature linkage being generated using the further identification feature, in the checking of the plausibility, the feature linkage being checked for plausibility using the inspection feature detected by the third sensor.

6. An apparatus for fusing data of various sensors of a vehicle within the scope of an object identification, comprising:

a device configured to perform the following:

receiving, via a receiver unit, at least one identification feature detected by a first sensor and at least one identification feature detected by a second sensor for identifying at least one object in the surroundings of the vehicle;

receiving, via the receiver unit, at least one inspection feature detected by the second sensor for inspecting the object identification, the identification feature detected by the first sensor and the inspection feature detected by the second sensor each representing a first measured variable and the identification feature detected by the second sensor representing a second measured variable independent of the first measured variable;

linking, via a linking unit, the identification feature detected by the first sensor to the identification feature detected by the second sensor in a corresponding feature fusion to form a feature linkage, wherein the linking unit is configured to link the inspection features to one another in a corresponding check fusion to form a redundant feature linkage; and checking, via a plausibility unit, the plausibility of the feature linkage using the inspection feature detected by the second sensor; and identifying, via an identification unit, one object or multiple objects in surroundings of the vehicle using a plausibility check result from the plausibility check unit, and relaying a corresponding piece of object information to an analysis unit to carry out a situation analysis with respect to a present situation of the vehicle, wherein the situation analysis enables tracking of the identified objects;

wherein the identifying of the one object or multiple objects is carried out based on an automotive safety integrity level (ASIL) decomposition, and the identified objects are used in a driver assistance system of the vehicle, and wherein a functional fusion is used to generate the objects, wherein the functional fusion is monitored with a redundant check fusion using a predetermined tolerance, so that the functional fusion is confirmed and authorized if the deviation between functional fusion and check fusion is not more than the predetermined tolerance, and wherein an identification feature detected by a third sensor represents a measured variable independent of the first measured variable and/or the second measured variable.

7. The apparatus of claim 6, wherein in the receiving, at least one identification feature detected by a third sensor for identifying the object and at least one further inspection feature detected by the first sensor and/or the second sensor for inspecting the object identification are received, the identification feature detected by the third sensor and the further inspection feature each representing the same measured variable, in the linking, the feature linkage being generated using the identification feature detected by the third sensor, in the checking of the plausibility, the feature linkage being checked for plausibility using the further inspection feature.

8. The apparatus of claim 6, wherein in the receiving, at least one further identification feature detected by the first sensor and/or the second sensor for identifying the object and at least one inspection feature detected by the third sensor for inspecting the object recognition are received, the further identification feature and the inspection feature detected by the third sensor representing the same measured variable, in the linking, the feature linkage being generated using the further identification feature, in the checking of the plausibility, the feature linkage being checked for plausibility using the inspection feature detected by the third sensor.

9. A non-transitory computer readable medium having a computer program, which is executable by a processor, comprising:
a program code arrangement having program code for fusing data of various sensors of a vehicle within the scope of an object identification, by performing the following:
receiving, via a receiver unit, at least one identification feature detected by a first sensor and at least one identification feature detected by a second sensor for identifying at least one object in the surroundings of the vehicle;
receiving, via the receiver unit, at least one inspection feature detected by the second sensor for inspecting the object identification, the identification feature detected by the first sensor and the inspection feature detected by the second sensor each representing a first measured variable and the identification feature detected by the second sensor representing a second measured variable independent of the first measured variable;
linking, via a linking unit, the identification feature detected by the first sensor to the identification feature detected by the second sensor in a corresponding feature fusion to form a feature linkage, wherein the linking unit is configured to link the inspection features to one another in a corresponding check fusion to form a redundant feature linkage; and
checking, via a plausibility unit, the plausibility of the feature linkage using the inspection feature detected by the second sensor; and identifying, via an identification unit, one object or multiple objects in surroundings of the vehicle using a plausibility check result from the plausibility check unit, and relaying a corresponding piece of object information to an analysis unit to carry out a situation analysis with respect to a present situation of the vehicle, wherein the situation analysis enables tracking of the identified objects;
wherein the identifying of the one object or multiple objects is carried out based on an automotive safety integrity level (ASIL) decomposition, and the identified objects are used in a driver assistance system of the vehicle,
wherein a functional fusion is used to generate the objects, wherein the functional fusion is monitored with a redundant check fusion using a predetermined tolerance, so that the functional fusion is confirmed and authorized if the deviation between functional fusion and check fusion is not more than the predetermined tolerance, and
wherein an identification feature detected by a third sensor represents a measured variable independent of the first measured variable and/or the second measured variable.

10. The computer readable medium of claim 9, wherein in the receiving, at least one inspection feature detected by the first sensor for inspecting the object identification is received, the inspection feature detected by the first sensor representing the second measured variable, in the linking, the inspection feature detected by the first sensor being linked to the inspection feature detected by the second sensor, to generate the redundant feature linkage in the checking of the plausibility, the feature linkage being checked for plausibility using the redundant feature linkage.

11. The computer readable medium of claim 9, wherein in the receiving, at least one identification feature detected by the third sensor for identifying the object and at least one further inspection feature detected by the first sensor and/or the second sensor for inspecting the object identification are received, the identification feature detected by the third sensor and the further inspection feature each representing the same measured variable, in the linking, the feature linkage being generated using the identification feature detected by the third sensor, in the checking of the plausibility, the feature linkage being checked for plausibility using the further inspection feature.

12. The computer readable medium of claim 9, wherein in the receiving, at least one further identification feature detected by the first sensor and/or the second sensor for identifying the object and at least one inspection feature detected by the third sensor for inspecting the object recognition are received, the further identification feature and the inspection feature detected by the third sensor representing the same measured variable, in the linking, the feature linkage being generated using the further identification feature, in the checking of the plausibility, the feature linkage being checked for plausibility using the inspection feature detected by the third sensor.

* * * * *